3,077,232
IMPLEMENT HITCH DEVICE
Antonín Frolík, Zatec, Czechoslovakia, assignor to Ceskoslovenska akademie zemedelskych ved, Prague, Czechoslovakia
Filed Dec. 23, 1959, Ser. No. 861,652
Claims priority, application Czechoslovakia Dec. 30, 1958
4 Claims. (Cl. 172—450)

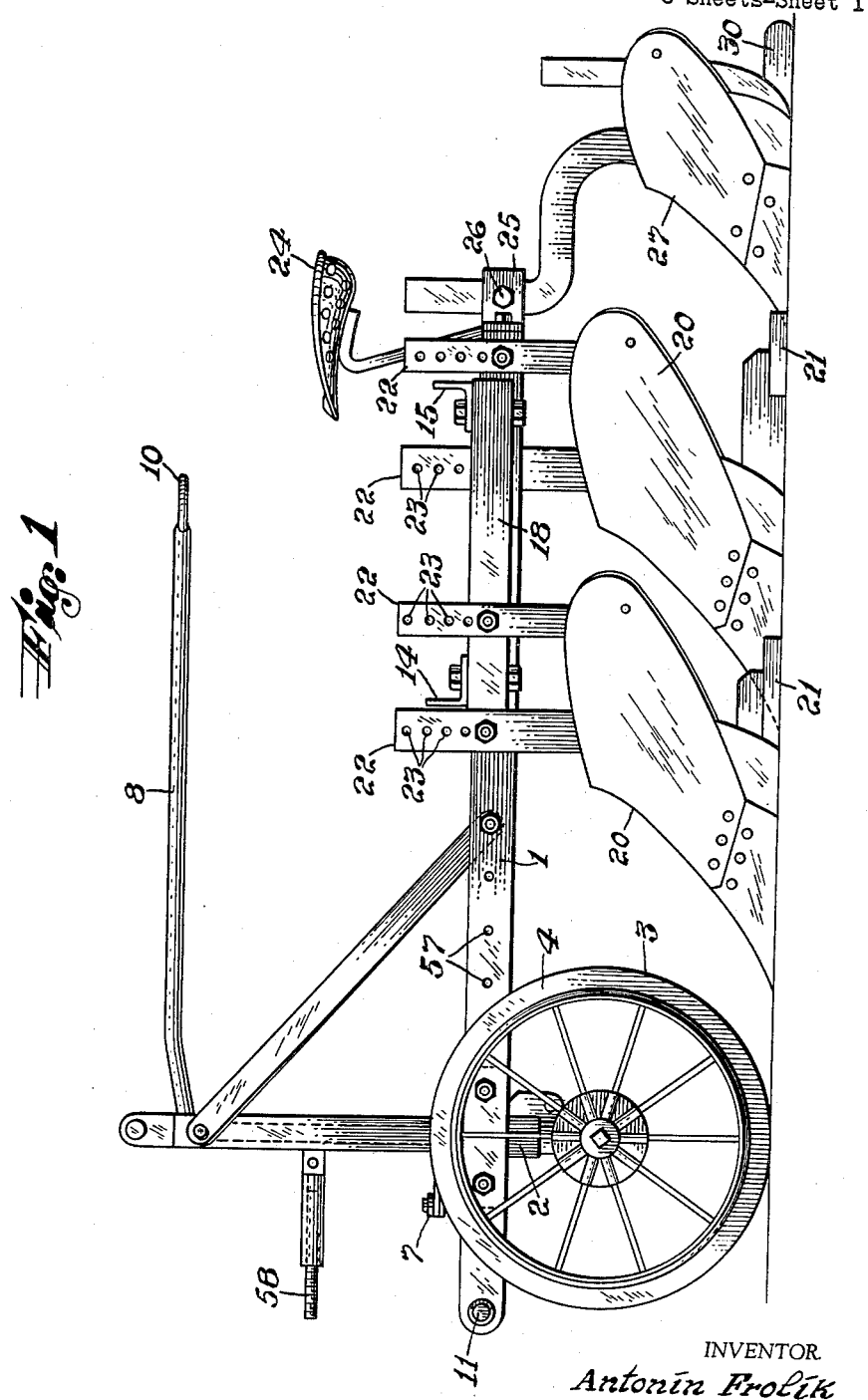

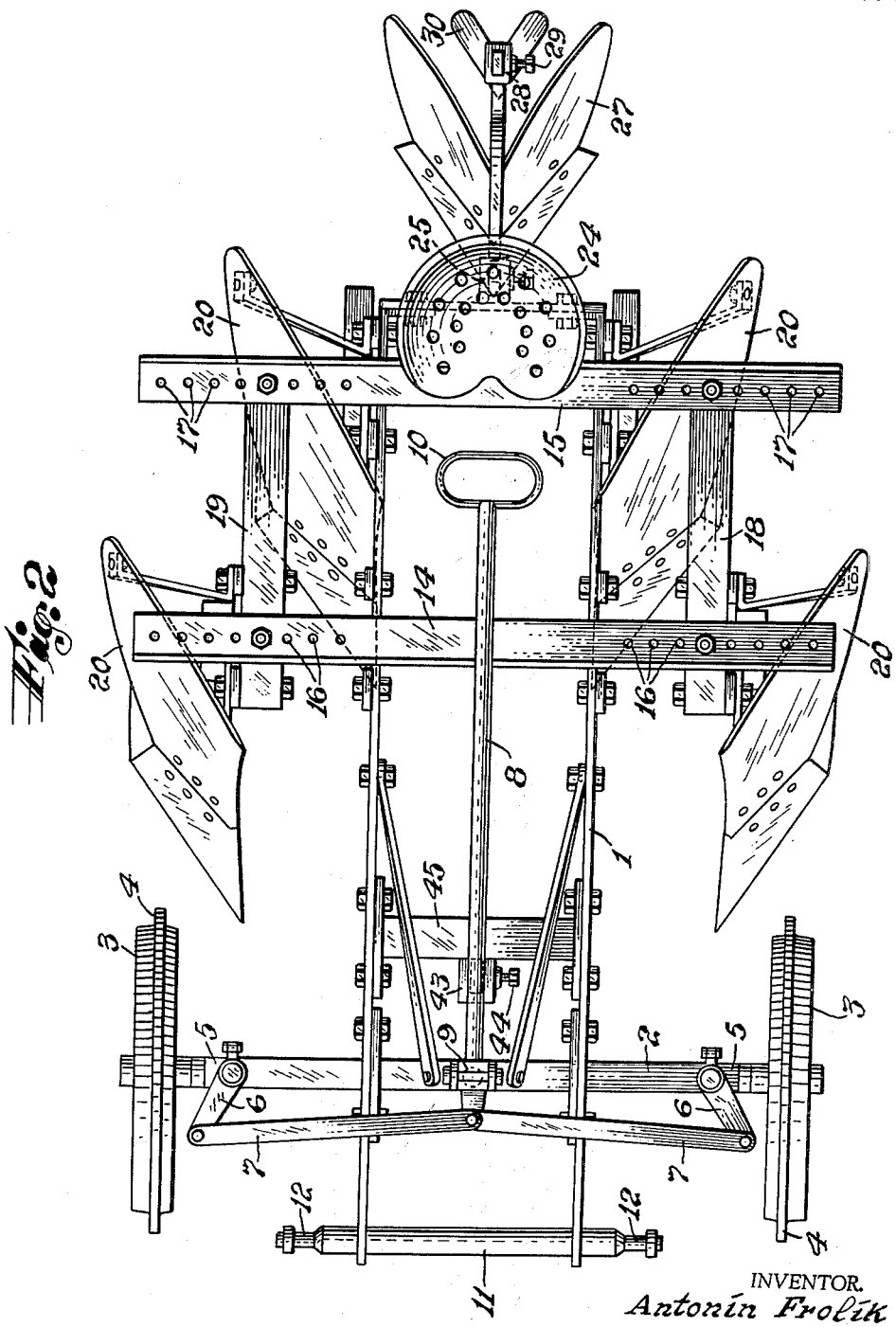

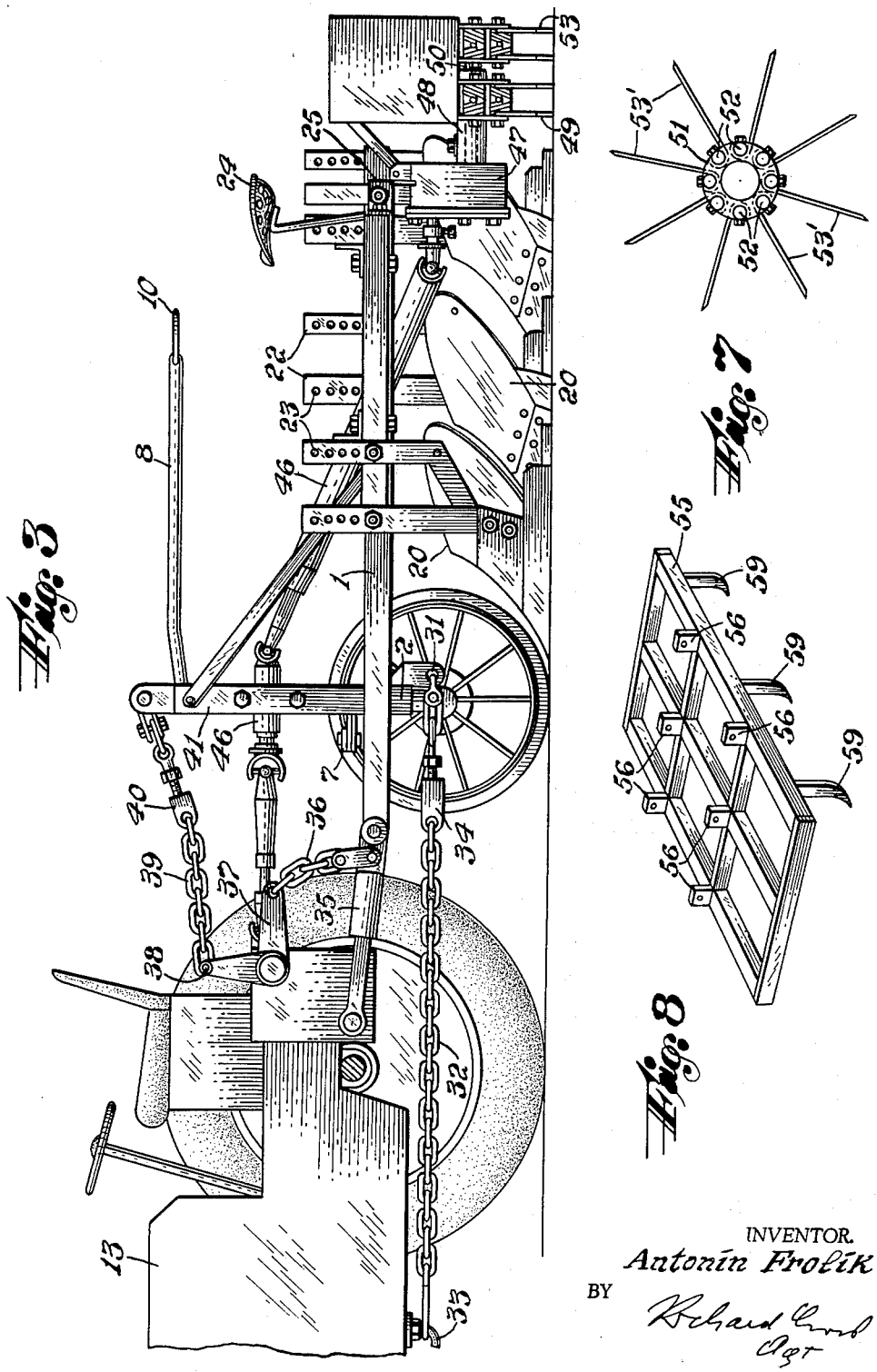

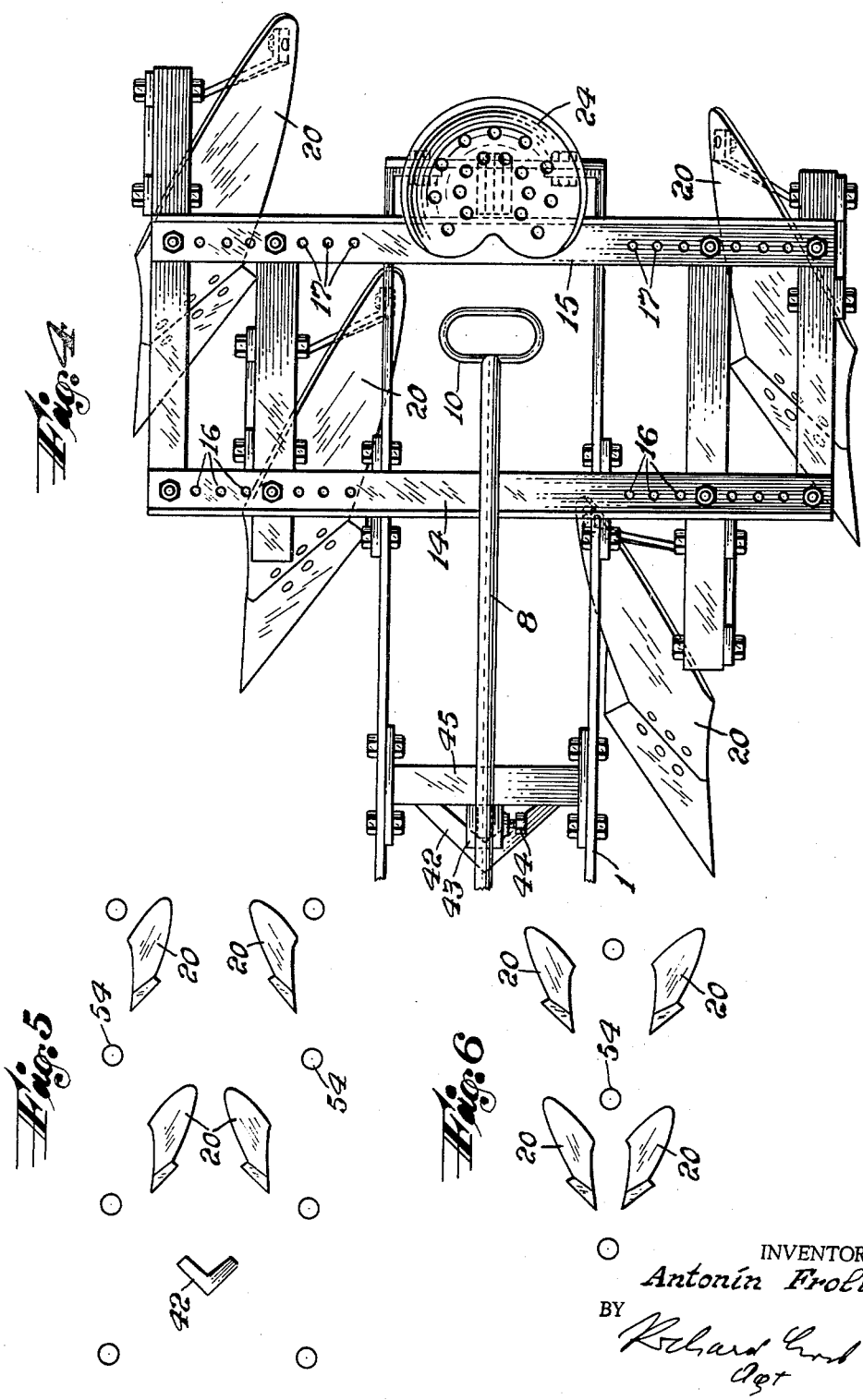

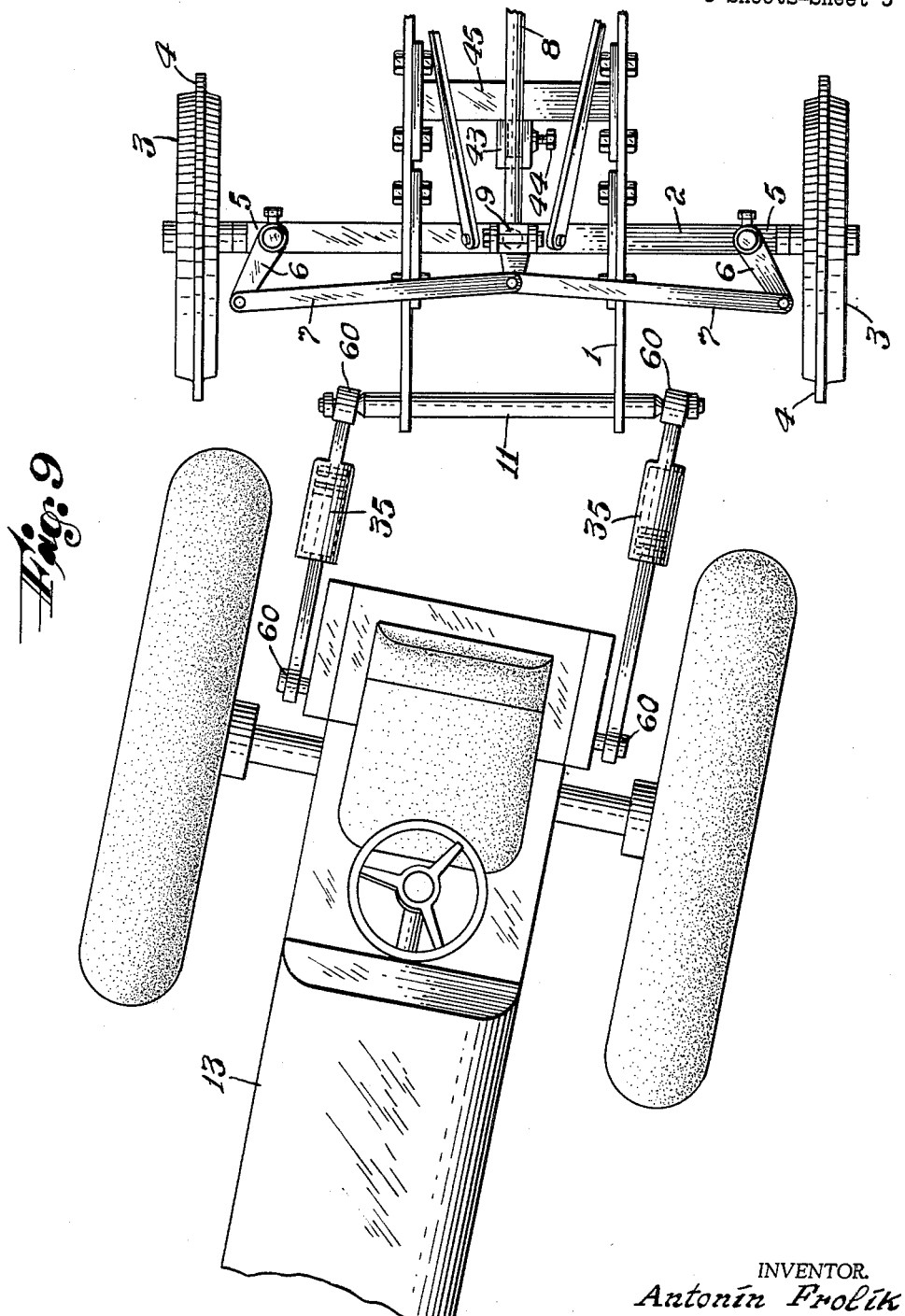

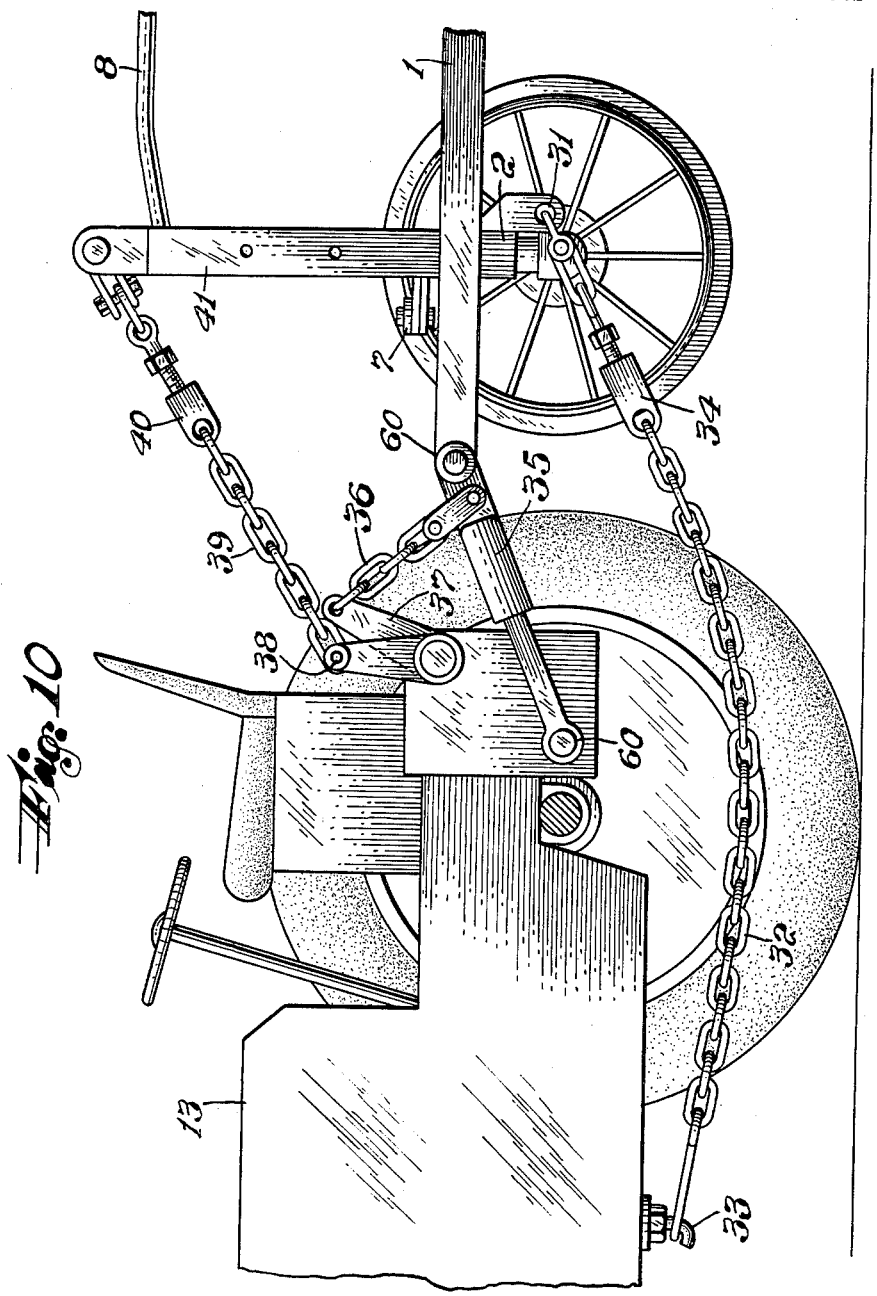

The present invention relates to a plough to be used in hop-cultivation. Various cultivation implements are used in hop-fields for covering the stock in the fall and uncovering it in the spring. Up to now such work has been performed usually with the aid of one-share ploughs, so that each row of hop-vines has to be traversed twice. It being necessary to carry out the covering or uncovering operation within the shortest possible time, the previously used implements have not been found satisfactory from the agrotechnical point of view.

It is the primary object of the present invention to provide a device permitting the cultivation of hop-fields to be carried out with considerable speed.

Another object of the invention is to provide a device which can easily be adapted for a wide range of operations to be carried out in hop-fields, such as covering or uncovering the stock, hoeing etc.

A further object of the invention is to provide a plough to be used in the cultivation of hop-fields, which can operate on sloping ground, while ensuring an exact travel of the machine either above the row of vines or in-between, as required. A still further object of the invention is to provide an implement adapted to clean and treat the soil not only between the rows of vines but directly in the rows.

These and other objects of the present invention will become apparent to those skilled in the art as the description and illustration thereof proceeds.

According to the invention a two-sided plough is provided, drawn by a tractor and comprising sets of adjustable plough-shares and subsoiling tines. The plough can be equipped with a rotary cleaning device, if cleaning of the row is desired. For work on sloping ground the plough is attached to the tractor by means of a loose chain, further by a pair of telescopic links and auxiliary chains enabling an easy control of the plough and serving also for lifting the plough into position for transport.

In order that the invention may be clearly understood and readily carried into effect, the same will now be described with reference to the accompanying drawings, in which FIG. 1 is a side view of the plough bodies with the plough mounted in one operative position, FIG. 2 is the corresponding plan view, FIG. 3 shows a side view of the plough provided with the cleaning device and arranged for operation on sloping ground, the plough bodies being mounted in another operative position, FIG. 4 is a plan view of the plough showing the plough bodies mounted in a position corresponding to FIG. 3, the cleaning device and parts associated therewith being omitted for the sake of clarity, FIG. 5 shows in a diagrammatic representation one operation of the plough, FIG. 6 shows in a similar representation another operation carried out with the plough, FIG. 7 is an elevational view of the cleaning disc, FIG. 8 shows the cultivation attachment in a perspective view, FIG. 9 shows portions of the apparatus of FIG. 3 in plan view as positioned when moving over uneven ground, and FIG. 10 is a side-elevational view of portions of the apparatus of FIG. 3 with the plough lifted into position for transport.

The plough will be described in the following disclosure first to show various possibilities of adjustment and then to explain operations which may be carried out, so as to demonstrate the numerous possibilities of application and wide range of tasks, for which the machine is suitable.

Referring first to FIGURES 1 and 2, which represent one possible adjustment of the plough, the latter comprises a frame 1 designed as a sturdy and rigid structure, mounted in the front on an undercarriage 2 with steering wheels 3 which are provided with collars 4 preventing the wheels from skidding sideways. The wheels 3 are mounted on rockable axles 5 which are connected by means of connecting rods 6 to links 7. Pivotally connected to the links 7 is a steering lever 8 which is journalled on a tube or pivot 9 so that by a lateral movement of a handle 10 the steering wheels 3 are deflected in the required direction, controlling thus the travel of the plough.

Secured in the front part of the frame 1 is a lateral draw bar 11 with pivot pins 12 adapted for attachment to the links of the hydraulic mechanism of a tractor 13 (FIG. 3).

Carriers 14 and 15 are disposed transverse to the longitudinal axis of the frame 1, said carriers being provided with rows of bores 16 and 17. Supported by said carriers are holders 18, 19 carrying plough body shares 20 of a conventional design which, however, are slightly modified to comply with the particular requirements of work in a hop-field, i.e. the soles 21 are shorter in the front and longer at the back than in the conventionally used designs. The plough bodies 20 are adjustable sideways to any required width by displacing the holders 18, 19 in the bores 16, 17 according to the distance of the rows of hop-vines from one another. As best seen in FIG. 2, the plough bodies 20 extend laterally outward from the holders 18, 19. The plough bodies are carried by standards 22 provided with bores 23, by means of which the plough body can be adjusted in vertical direction, in order to control the depth of ploughing.

The driver's seat 24 is arranged on the frame 1 so as to afford a good view of the vines. A sleeve 25 is mounted on the frame behind the seat, said sleeve being provided with a set screw serving for the mounting and vertical adjustment of a rear share 27. The latter is two-sided, as apparent from FIGURE 2, and behind the share 27 a further sleeve 28 with a set screw 29 is arranged for the mounting of a subsoiling tine 30.

FIGURE 3 shows the suspension of the plough on the tractor for work on sloping ground. Provided on the undercarriage 2 is an eyelet 31 in which the rear end of a chain 32 is secured, the front end of which is suspended on a hook 33 on the tractor 13. The hook 33 is placed approximately in the middle of the tractor's length. The chain 32 carries a screw member 34 with threads serving to adjust the length of the chain. Instead of the arms of the hydraulic mechanism two telescopic links 35 which can be freely telescoped are each pivotally attached to the draw bar 11 and to pivots on the tractor. Attached to the portion of each link 35 which is attached to the draw bar 11 is one end of a chain 36, the other end of which is fastened to the free end of an arm 37 which normally extends horizontally from the tractor 13 and may be swung upward by the hydraulic mechanism of the tractor. One end of a chain 39 is fastened to an eyelet 38 rigidly mounted on the tractor above the links 35, said chain 39 being likewise provided with an adjusting screw member 40. The other end of the chain 39 is attached to a portion of a vertical arm 41 rigidly connected to the undercarriage 2 which is above the links 35.

FIGURE 3 shows also the arrangement of the cleaning device. Joined to the power take-off shaft of the tractor 13 is a telescopic universal joint transmission mechanism 46 which transmits the drive to a gear box 47 which, in the arrangement of the plough shown in FIGURE 3, is secured in the sleeve 25 to allow for an adjustment of the height of the gear box. From the gear box projects a hollow shaft 48 carrying a cleaning disc 49 and a further shaft (central shaft) 50 passes through the hollow shaft 48, said shaft 50 carrying another cleaning disc 53. The discs 49 and 53 rotate in opposite directions. Each disc consists of two rings 51 connected by pins 52 which carry resilient fingers 53'.

FIGURE 4 illustrates the adjustment of the plough bodies for ploughing between the rows of hop-vines. The plough bodies 20 which, according to FIGURE 2, are placed in position for uncovering the stock, are displaced in such a manner, that the plough bodies which were at the right hand side, as seen in FIG. 2, are placed on the left hand side and vice versa. In this way an assembly is produced, as shown in FIGURE 4, the operation of which will be described later. In connection with this assembly a further pointed share 42 has to be used, said share 42 being suitably reinforced and widened and fixed in a sleeve 43 (FIG. 2) provided with a set screw 44. The sleeve 43 is fixed to the frame 1 by means of a carrier 45.

The operation of the plough according to the invention will now be explained with reference to the diagrams shown in FIGURES 5 and 6.

The work of the plough in a hop-field starts with ploughing up the ground. This operation is shown in FIGURE 5, the plough bodies being placed as shown in FIGURE 4. The plough advances between two rows 54 of vines and its plough bodies plough up the soil between the rows, creating a ridge while the front share 42 loosens that portion of the soil which has not been ploughed by the plough bodies 20.

The plough is then adjusted to a position shown in FIGURE 2, whereupon it is made to advance above the row of vines, as shown in FIGURE 6. The plough bodies 20 plough the soil off the vines (uncovering of stock). If necessary, the rotary cleaning device according to FIGURE 3 is used. The resilient fingers 53 clean the stock, wiping the excessive soil aside.

The assembly according to FIGURE 5 can be used also for covering the stock in the winter. From the plough as shown in FIGURE 4 the pointed share 42 is removed and the plough is drawn over the row of vines. A strip of unploughed ground remains between the rows and this strip of unploughed soil is now worked with the plough arranged according to FIGURE 2. It has to be noted that the rear subsoiling tine 30 has an important task to fulfill in this operation, said share loosening and breaking up the ploughed furrow.

In hop-fields situated on sloping ground the plough assembly according to FIGURE 3 is used. As seen from the views of FIGS. 3 and 9, the plough is connected to the tractor 13 by the chains 32, 36, and 39, omitted from FIG. 9 for the sake of clarity, and by the two telescopic links 35. The chains are tension elements and permit angular movement of the plough independent from the tractor within the limits set by the extensibility of the links 35. Respective elements of each link are attached to the tractor 13 and to the plough by pivots 60 which permit some movement in all directions. As shown in FIG. 9, the two telescoping elements of the left link 35 are almost fully extended, and the two telescoping elements of the right link 35 are contracted to the limit so that they abut against each other in the direction of telescoping movement. The plough therefore can travel at an angle to the direction of tractor movement without interference from the links 35. The chains 36 and 39 are slack in all operative positions of the plough, and do not interfere with independent steering of the plough or movement thereof as called for by the uneven ground. The pull of the tractor is transmitted exclusively by the tension in the chain 32, as is evident from FIG. 3.

If the plough is to be raised into its position for transport illustrated in FIG. 10, the arms 37 of the hydraulic mechanism pivot the telescopic links 35 upward on the tractor 13 by means of the chains 36, and thereby raise the front part of the plough. The chains 36 are fastened to respective elements of the links 35 pivotally attached to the plough, so that links 35 are fully contracted during the initial stage of the pivoting movement of the arms 37. When the chain 39 is tensioned by the upward movement of the front part of the plough, the entire plough starts moving upward until it reaches the position shown in FIG. 10. The chain 32 has, of course, to be adjusted so as not to hinder the lifting operation.

The plough according to the invention can also be used for cultivation. In this case the plough bodies and their accessories are removed and a cultivating attachment 55 (FIG. 8) is secured in the frame 1. The cultivation attachment comprises a frame carrying various types of shares 59 (three of which only are shown) adjustably mounted thereon.

The cultivation attachment 55 mounted on the plough according to the invention has the advantage that it can easily be steered; this is important in particular for work carried out during the vegetation period. The cultivation attachment 55 is fixed to the frame 1 by means of a plurality of plates 56 which are screwed to the frame 1.

FIG. 1 shows an auxiliary telescopic attachment 58, secured to the vertical tube 9 of the steering mechanism. The attachement 58 is adapted to be fastened to the tractor, for instance when the plough works with the cultivation attachment 55; the plough is thus positively steered by the tractor and need not be steered manually no driver being then necessary to operate the plough.

The frame 1 is provided with a plurality of openings 57 which serve either for securing and adjusting the plough bodies 20 and the cultivation attachment 55 or other component parts of the plough.

I claim:
1. In an agricultural apparatus including tractor means, an implement, and means for attaching said implement to said tractor means for movement of said implement by said tractor in a predetermined direction, the improvement in the attaching means which comprises
   (a) two elongated tension elements each having two end portions;
   (b) means for securing respective end portions of said tension elements to said tractor mean and to said implement respectively;
   (c) two links, each including two telescoping members;
   (d) first pivot means for attaching one member of each link to said tractor means;
   (e) second pivot means for attaching the other member of each link to said implement, said links being spaced transversely of said tractor means in a normally horizontal direction; and
   (f) means for pivoting said links about said first pivot means between a lowered and an elevated position, said tension elements being secured to a portion of said implement upwardly spaced from said second pivot means, said tension elements being slack when said links are in said lowered position, and tensioned when said links are in said elevated position.

2. In an apparatus as set forth in claim 1, said tension elements being chains.

3. In an apparatus as set forth in claim 1, said means for pivoting said links including an arm having one end portion pivoted to said tractor means, and a free end portion; and a third elongated tension element having respective end portions attached to said free end portion and to one of said links at a point thereof spaced from said first pivot means.

4. In an apparatus as set forth in claim 1, means for adjusting the length of one of said tension elements.

References Cited in the file of this patent

UNITED STATES PATENTS

| | | |
|---|---|---|
| 633,267 | Jensen et al. | Sept. 19, 1899 |
| 1,635,605 | Chancey | July 12, 1927 |
| 2,171,031 | Graham et al. | Aug. 29, 1939 |
| 2,547,438 | Burkholder | Apr. 3, 1951 |
| 2,672,718 | Thomas | Mar. 23, 1954 |
| 2,748,682 | Stone | June 5, 1956 |
| 2,752,838 | Rudio | July 3, 1956 |

FOREIGN PATENTS

| | | |
|---|---|---|
| 81,533 | Denmark | July 23, 1956 |
| 551,449 | France | Jan. 9, 1923 |
| 404,569 | Italy | June 18, 1943 |
| 160,918 | Sweden | Jan. 19, 1954 |